US009348495B2

(12) United States Patent
Young et al.

(10) Patent No.: US 9,348,495 B2
(45) Date of Patent: May 24, 2016

(54) CONTROL OF LARGE SCREEN DISPLAY USING WIRELESS PORTABLE COMPUTER AND FACILITATING SELECTION OF AUDIO ON A HEADPHONE

(71) Applicant: Sony Corporation, Tokyo (JP)

(72) Inventors: David Andrew Young, San Diego, CA (US); Liviu Burciu, San Diego, CA (US); Louis Le, San Diego, CA (US); Steven Martin Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 14/271,282

(22) Filed: May 6, 2014

(65) Prior Publication Data

US 2015/0256895 A1  Sep. 10, 2015

Related U.S. Application Data

(60) Provisional application No. 61/949,545, filed on Mar. 7, 2014.

(51) Int. Cl.
*G06F 3/0484* (2013.01)
*G06F 3/14* (2006.01)
*H04N 5/44* (2011.01)
*A63F 13/27* (2014.01)
*G06F 3/0481* (2013.01)
*G09G 5/377* (2006.01)
*H04L 29/08* (2006.01)
(Continued)

(52) U.S. Cl.
CPC ........ *G06F 3/04847* (2013.01); *A63F 13/2145* (2014.09); *A63F 13/26* (2014.09); *A63F 13/27* (2014.09); *A63F 13/92* (2014.09); *G06F 3/0481* (2013.01); *G06F 3/04842* (2013.01); *G06F 3/04845* (2013.01); *G06F 3/1454* (2013.01); *G09G 5/377* (2013.01); *H04L 67/025* (2013.01); *H04N 5/4403* (2013.01); *H04N 21/4126* (2013.01); *H04N 21/4222* (2013.01); *H04N 21/42224* (2013.01); *H04N 21/439* (2013.01); *H04N 21/43637* (2013.01); *H04N 21/4852* (2013.01); *H04N 2005/4408* (2013.01)

(58) Field of Classification Search
None
See application file for complete search history.

(56) References Cited

U.S. PATENT DOCUMENTS 6,400,378 B1  6/2002  Snook
7,219,309 B2  5/2007  Kaasila et al.
(Continued)

OTHER PUBLICATIONS

David Andrew Young, Louis Le, Steven Martin Richman, "Control of Large Screen Display Using Wireless Portable Computer Interface with Display Controller", related pending U.S. Appl. No. 14/271,156, filed May 6, 2014.
(Continued)

*Primary Examiner* — Justin Shepard
(74) *Attorney, Agent, or Firm* — John L. Rogitz

(57) ABSTRACT

A multi-window user interface (UI) on a control device such as a tablet computer communicates commands to a display controller, which may be implemented by a game console. The controller controls presentation on a large screen display according to the commands. A tertiary device such as a wireless phone can obtain an application listing audio feeds associated with various videos presented on the display so that a user can listen via headphones to a first audio stream associated with a first video window on the display when the display speakers are playing audio associated with a second video window on the display.

17 Claims, 8 Drawing Sheets

(51) Int. Cl.

| | | |
|---|---|---|
| H04N 21/41 | (2011.01) | |
| H04N 21/422 | (2011.01) | |
| H04N 21/439 | (2011.01) | |
| H04N 21/485 | (2011.01) | |
| A63F 13/26 | (2014.01) | |
| A63F 13/2145 | (2014.01) | |
| A63F 13/92 | (2014.01) | |
| H04N 21/4363 | (2011.01) | |

(56) References Cited

U.S. PATENT DOCUMENTS

| | | |
|---|---|---|
| 7,631,277 B1 | 12/2009 | Nie et al. |
| 8,045,844 B2 | 10/2011 | Sasaki et al. |
| 8,085,851 B2 | 12/2011 | Toma et al. |
| 8,149,267 B2 | 4/2012 | Sasaki et al. |
| 8,150,238 B2 | 4/2012 | Sasaki et al. |
| 8,164,619 B2 | 4/2012 | Sasaki et al. |
| 8,208,790 B2 | 6/2012 | Toma et al. |
| 8,270,807 B2 | 9/2012 | Sasaki et al. |
| 8,290,338 B2 | 10/2012 | Sasaki et al. |
| 8,429,174 B2 | 4/2013 | Ramani et al. |
| 8,467,664 B2 | 6/2013 | Sasaki et al. |
| 8,520,055 B2 | 8/2013 | Sasaki et al. |
| 8,520,056 B2 | 8/2013 | Sasaki et al. |
| 8,538,234 B2 | 9/2013 | Sasaki et al. |
| 8,559,737 B2 | 10/2013 | Sugio et al. |
| 8,660,189 B2 | 2/2014 | Toma et al. |
| 8,666,231 B2 | 3/2014 | Sasaki et al. |
| 8,667,017 B1 | 3/2014 | Forney et al. |
| 2003/0137522 A1 | 7/2003 | Kaasila et al. |
| 2005/0019016 A1 | 1/2005 | Nakashika et al. |
| 2007/0092217 A1 | 4/2007 | Nakashika et al. |
| 2008/0259205 A1 | 10/2008 | Fukuda et al. |
| 2010/0021145 A1 | 1/2010 | Oashi et al. |
| 2010/0086285 A1 | 4/2010 | Sasaki et al. |
| 2010/0111370 A1 | 5/2010 | Black et al. |
| 2010/0165083 A1 | 7/2010 | Sasaki et al. |
| 2010/0202759 A1 | 8/2010 | Sasaki et al. |
| 2010/0232767 A1 | 9/2010 | Sasaki et al. |
| 2010/0254679 A1 | 10/2010 | Sasaki et al. |
| 2010/0303444 A1 | 12/2010 | Sasaki et al. |
| 2011/0008024 A1 | 1/2011 | Sasaki et al. |
| 2011/0013890 A1 | 1/2011 | Sasaki et al. |
| 2011/0050847 A1 | 3/2011 | Sasaki et al. |
| 2011/0119611 A1 | 5/2011 | Ahn et al. |
| 2011/0129198 A1 | 6/2011 | Toma et al. |
| 2011/0142426 A1 | 6/2011 | Sasaki et al. |
| 2011/0149049 A1 | 6/2011 | Sasaki et al. |
| 2011/0158604 A1 | 6/2011 | Sasaki et al. |
| 2011/0161843 A1 | 6/2011 | Bennett et al. |
| 2011/0164111 A1 | 7/2011 | Karaoguz et al. |
| 2011/0164115 A1 | 7/2011 | Bennett et al. |
| 2011/0187817 A1 | 8/2011 | Sasaki et al. |
| 2011/0254929 A1 | 10/2011 | Yang et al. |
| 2011/0304773 A1* | 12/2011 | Okumura .................. 348/607 |
| 2011/0305443 A1 | 12/2011 | Sasaki et al. |
| 2011/0310235 A1 | 12/2011 | Sasaki et al. |
| 2012/0016917 A1 | 1/2012 | Priddle et al. |
| 2012/0033039 A1 | 2/2012 | Sasaki et al. |
| 2012/0044324 A1 | 2/2012 | Lee et al. |
| 2012/0075436 A1 | 3/2012 | Chen et al. |
| 2012/0106921 A1 | 5/2012 | Sasaki et al. |
| 2012/0133736 A1 | 5/2012 | Nishi et al. |
| 2012/0147141 A1 | 6/2012 | Sasaki et al. |
| 2012/0148218 A1 | 6/2012 | Sasaki et al. |
| 2012/0177343 A1 | 7/2012 | Sasaki et al. |
| 2012/0189274 A1 | 7/2012 | Toma et al. |
| 2012/0300031 A1 | 11/2012 | Horlander |
| 2012/0314965 A1 | 12/2012 | Kashiwagi et al. |
| 2013/0002821 A1 | 1/2013 | Okuda |
| 2013/0003848 A1 | 1/2013 | Sugio et al. |
| 2013/0004093 A1 | 1/2013 | Sugio et al. |
| 2013/0055129 A1 | 2/2013 | Lee et al. |
| 2013/0141533 A1 | 6/2013 | Suh et al. |
| 2013/0169765 A1 | 7/2013 | Park et al. |
| 2013/0191861 A1 | 7/2013 | Sasaki et al. |
| 2013/0194378 A1 | 8/2013 | Brown |
| 2013/0223456 A1 | 8/2013 | Kim et al. |
| 2013/0235270 A1 | 9/2013 | Sasaki et al. |
| 2013/0238758 A1 | 9/2013 | Lee et al. |
| 2013/0243227 A1* | 9/2013 | Kinsbergen et al. .......... 381/314 |
| 2013/0279883 A1 | 10/2013 | Ogawa et al. |
| 2013/0287090 A1 | 10/2013 | Sasaki et al. |
| 2013/0293676 A1 | 11/2013 | Sugio et al. |
| 2013/0307929 A1 | 11/2013 | Hattori et al. |
| 2013/0308703 A1 | 11/2013 | Sugio et al. |
| 2013/0308706 A1 | 11/2013 | Sugio et al. |
| 2013/0313313 A1* | 11/2013 | Boudville .................. 235/375 |
| 2013/0314514 A1 | 11/2013 | Mochinaga et al. |
| 2013/0315472 A1 | 11/2013 | Hattori et al. |
| 2013/0335525 A1 | 12/2013 | Hattori et al. |
| 2014/0036033 A1 | 2/2014 | Takashi et al. |
| 2014/0037007 A1 | 2/2014 | Lee et al. |
| 2014/0037011 A1 | 2/2014 | Lim et al. |
| 2014/0050458 A1 | 2/2014 | Mochinaga et al. |
| 2014/0055561 A1 | 2/2014 | Tsukagoshi |
| 2014/0056577 A1 | 2/2014 | Ogawa et al. |

OTHER PUBLICATIONS

David Andrew Young, Liviu Burciu, Louis Le, "Control of Large Screen Display Using Wireless Portable Computer to Pan and Zoom on Large Screen Display", related pending U.S. Appl. No. 14/271,685, filed May 7, 2014.

* cited by examiner

US 9,348,495 B2

CONTROL OF LARGE SCREEN DISPLAY USING WIRELESS PORTABLE COMPUTER AND FACILITATING SELECTION OF AUDIO ON A HEADPHONE

FIELD OF THE INVENTION

The application relates generally to controlling a large screen display using a wireless portable computer such as a tablet or laptop computer interfacing with a display controller such as a game console.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is an entertainment ecosystem in the home or in a luxury suite at a stadium that includes a large screen high definition display controlled by a controller such as a personal computer (PC) or game console which receives commands from a portable control device such as a tablet computer.

Accordingly, a monitoring device includes at least one computer readable storage medium bearing instructions executable by a processor, and at least one processor configured for accessing the computer readable storage medium to execute the instructions to configure the processor for receiving at least one software application executable by the processor. The instructions when executed by the processor configure the processor for executing the application to present on the monitoring device a list of plural audio feeds, with each audio feed corresponding to a respective video content being simultaneously provided to a display device separate from the monitoring device. In this way, the display device can simultaneously present at least first and second video contents on a display thereof but play only first audio associated with only the first video content. The instructions when executed by the processor configure the processor for receiving selection of an audio feed from the list, and responsive to the selection, playing the audio feed on the monitoring device.

In some examples, the selection is such that a user of the monitoring device can view the display device and listen to the second audio on the monitoring device while viewing the second video content on the display device with the display device playing the first audio. The playing of the audio feed may be executed by playing the audio feed on headphones. The monitoring device may be established by a wireless telephone.

In examples, the processor when executing the instructions is configured for receiving the software application by imaging a bar code disposed on or near the display device and correlating the bar code to a network address at which the software application is available. The processor when executing the instructions may be configured for playing the audio feed on the monitoring device responsive to downloading the audio feed from a computer network.

In another aspect, a system includes a display device configured for presenting plural video contents in respective windows of the display device and for playing first audio associated with a first one of the video contents. The system includes a controller configured for controlling the display device, and a control device configured for communicating commands to the controller to control presentation on the display device. A monitoring device is configured for playing second audio associated with a second one of the video contents on the display device while the display device plays the first audio and presents the first and second video contents simultaneously.

In another aspect, a method includes providing plural video contents to a display device for simultaneous presentation thereof on the display device. The method includes providing plural audio streams to the display device for presentation of a user-selected one of the audio streams on the display device, the audio streams corresponding to respective ones of the video contents. Also, the method includes providing a list of the audio streams to a monitoring device for selection of one of the audio streams for play on the monitoring device, such that a user of the monitoring device can view the display device and listen to a first audio stream on the monitoring device while viewing a respective first video content on the display device with the display device playing a second audio stream associated with a second video content.

The details of the present invention, both as to its structure and operation, can be best understood in reference to the accompanying drawings, in which like reference numerals refer to like parts, and in which:

DETAILED DESCRIPTION

Figure 1:
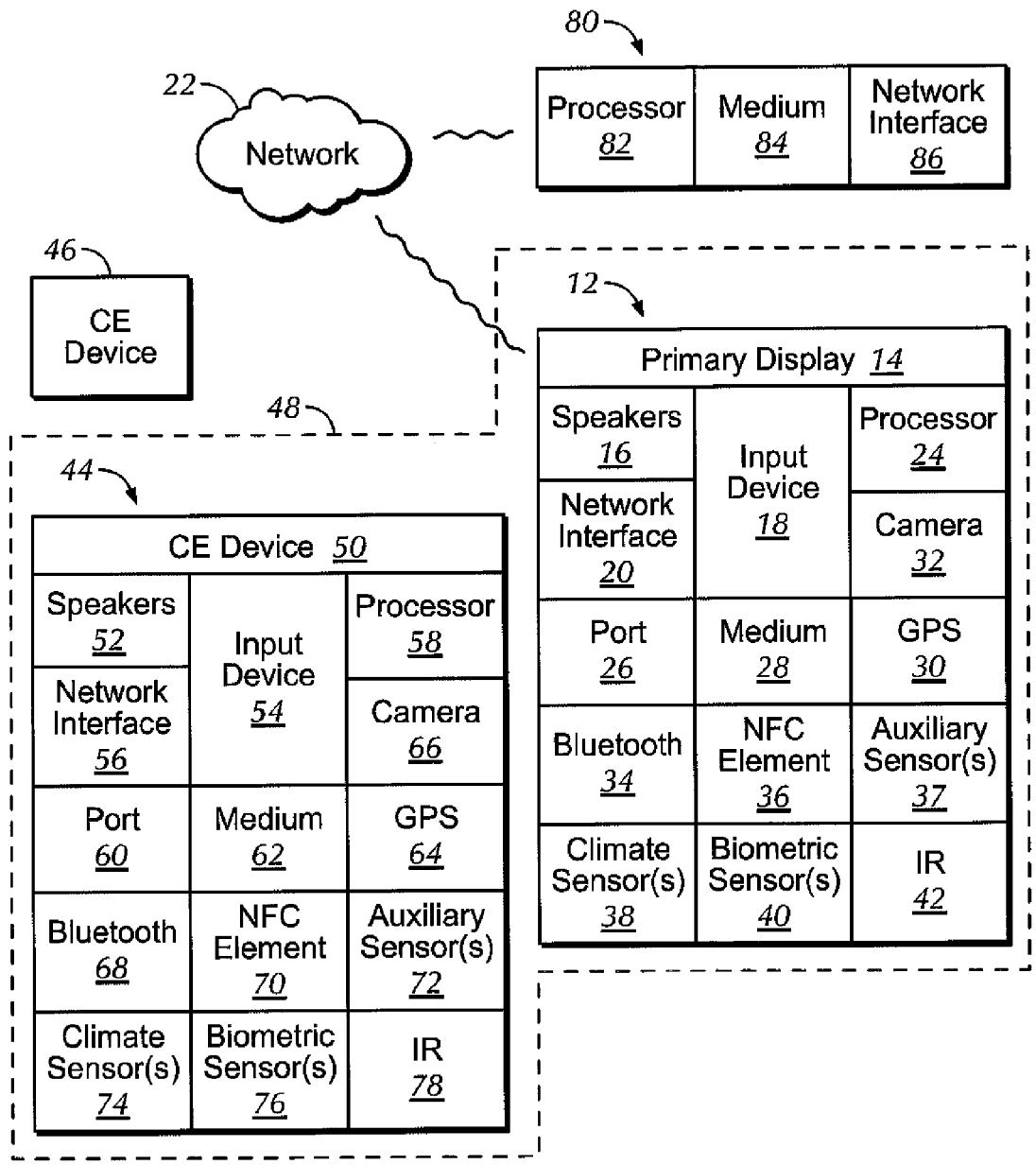
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a user through the headphones. The AVDD 12 may further include one or more tangible computer readable storage medium 28 such as disk-based or solid state storage. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a luxury suite of the stadium, or in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone.

The first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
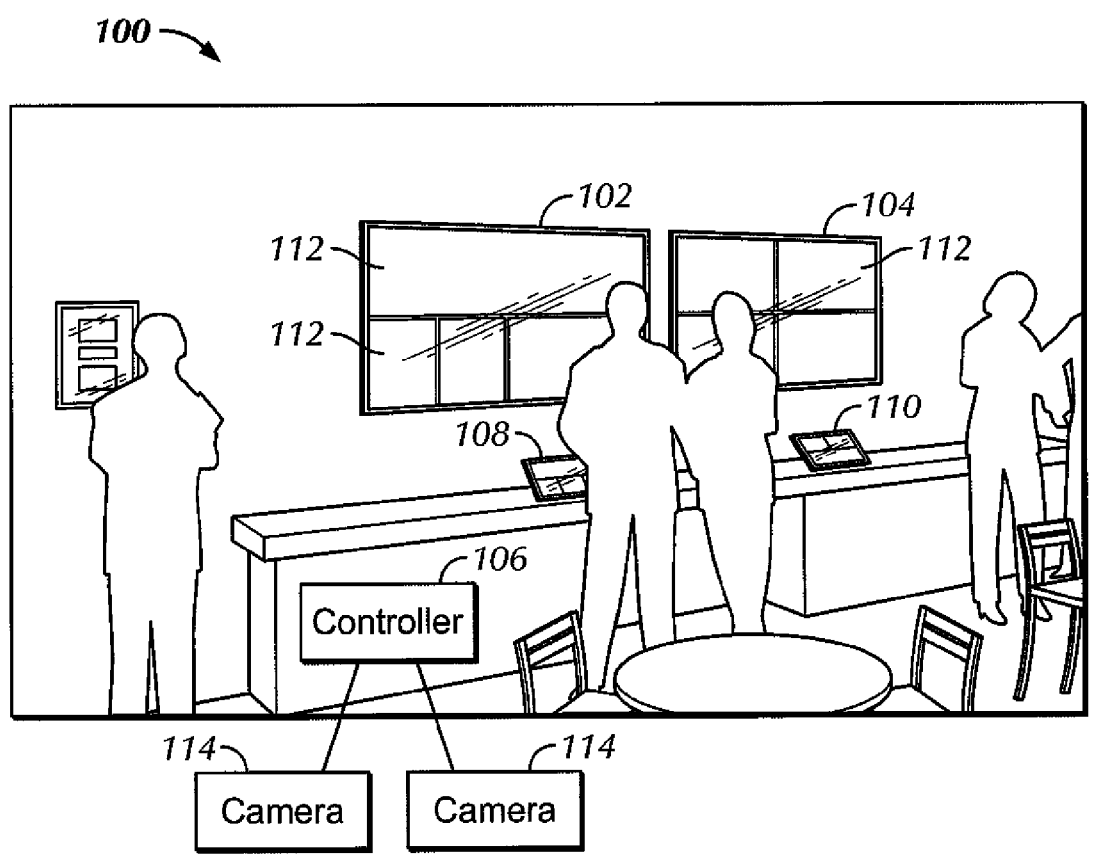
FIG. 2 is a partially schematic view of a specific example system with two UHD displays mounted on a wall side by side.

FIG. 2 shows an example system 100 in which first and second ultra high definition (UHD) displays 102, 104 are mounted on a wall, e.g., a wall of a home or a luxury stadium box. The UHD displays 102, 104 may be 4K displays. One or more control devices control presentation of the displays by sending commands wirelessly and/or over wired paths to one or more controllers. In the non-limiting example shown, a controller 106 controls the displays 102, 104, it being understood that a separate controller may be provided for each display. In the non-limiting example shown, content control on the first display 102 is established by a first control device 108 while content control on the second display 104 is established by a second control device 110, it being understood that a single control device may be used to establish control on both displays.

The control devices 108, 110 may be, without limitation, portable computers such as tablet computers or laptop computers (also including notebook computers) or other devices with one or more of the CE device 44 components shown in FIG. 1. The displays 102, 104 may be monitors only and/or may include one or more of the primary display 14 components shown in FIG. 1. The controller 106 may be a personal computer (PC) or game console or server that contains one or more of the components variously shown in FIG. 1. In the non-limiting example shown, the control devices 108, 110 communicate directly with the controller 106 using, e.g., WiFi or Bluetooth; the control devices 108, 110 do not communicate directly with the displays 102, 104. Instead, the controller 106 communicates with the displays 102, 104 to establish presentation thereon in accordance with commands received from the control devices. It is to be understood that while the controller 106 is shown physically separate from the displays in FIG. 2, it may be incorporated within the chassis of a display. As also shown, the displays may present plural contents in respective content windows 112.

The controller 106 may receive video from plural video cameras 114. In the stadium context, a first camera 114 may image a first half of a sports field, racetrack, or other action venue whereas as second camera 114 may image the other half of the action venue, with the feeds from the two cameras being combined before being sent to the controller 106 or combined by the controller 106 and "stitched" to present a single video view of both halves of the action venue on one or both of the displays 102, 104. That is, the combined feed from both cameras may be presented on a single display in an 8K mode, or the combined feed may be spread across the juxtaposed displays such that one display shows one half of the action venue and the other display shows the other half. It will be appreciated that the feeds sent to the controller preferably are HD or more preferably UHD.

As well, the cameras 114 (through appropriate image processing down-resolution components) can present the same video feeds albeit at a lower resolution to the control devices 108, 110. The UHD feeds may be sent to the controller 106 over a network from a network address while the lower resolution feeds of the same content may be simultaneously sent to the control devices 108, 110 over the network from the same or a different network address, such that the video content on the control devices is the same as the video content presentable on the displays, albeit typically of a lower resolution.

Note that a dedicated local server or PS4 may not be required in some embodiments to manage the 4K and thumbnail feeds as well as analyze the commands coming from the tablet. Instead, this can happen in the cloud with the 4K TV and tablet having their own MAC address and the cloud server acting as though it were local to permit control of 4K monitors in remote locations as well.

A location sensing system such as any of those described above may be used to determine where the control device is relative multiple 4K display locations to allow the user to roam and have the 4K content follow him. This provides for multiple 4K clusters in a stadium suite, each showing the same or different content. In this case what is showing on a particular 4K TV cluster can drive the UI on the tablet, or the other way around.

Additionally, each camera typically is associated with one or more microphones for capturing audio associated with the video to establish respective audio video (AV) streams. As more fully described below in reference to FIG. 8, the audio from the AV streams as well as other audio may be separately provided to a tertiary monitoring device such as a headphone-equipped wireless phone to enable a user of the monitoring device to monitor any audio associated with any of the videos shown in the various windows of the display regardless of which audio the speakers of the display itself are playing.

Figure 3:
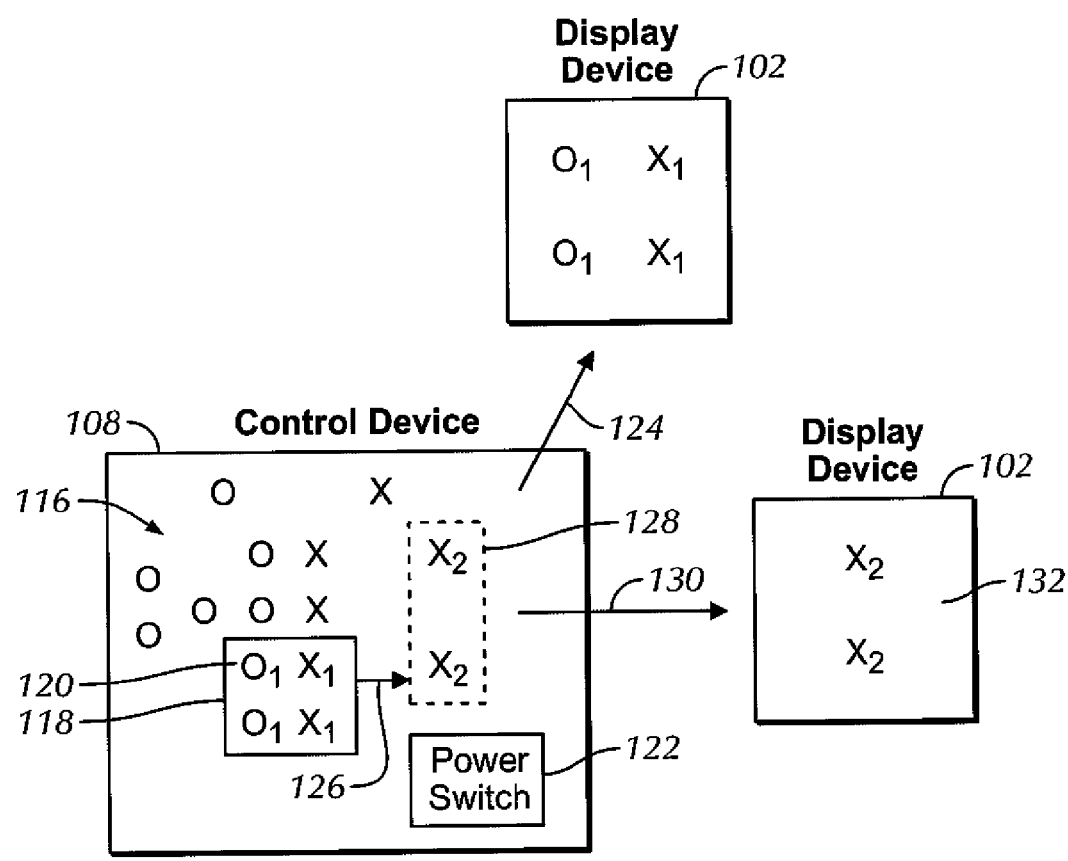
FIG. 3 is a schematic diagram illustrating control of video presentation on a display using a movable window on a control device.

In FIG. 3, a control device such as the control device 108 shown in FIG. 2 presents on its display a user interface (UI) 116 of a user interface (UI) presenting a video image of content and a border 118 superimposed on a portion 120 of the video image which is smaller than the video image as shown. For illustration, assume the video image in FIG. 3 is of a football game, with "Os" representing offensive players and "Xs" representing defensive players.

When a user has instantiated the border 118 (by, e.g., selecting a "pan and zoom" selector 122), the control device in response sends a command to the controller to cause a large display such the display 102 in FIG. 2 to present on the display 102 only the (higher definition) portion of the content enclosed in the border 118 on the control device 108. In the illustration shown, the user has positioned the border 118 on the control device 108 over two offensive players and two defensive players with subscripts "1" to distinguish them from the other player symbols in the figure. In response, the control device, as indicated by the arrow 124, has commanded the controller to present on the display device 102 only the content enclosed by the border on the control device, in the example shown, to present only the two offensive players and two defensive players with subscripts "1". It will readily be appreciated that the controller further has zoomed the video presentation on the demanded portion to substantially fill the entire screen of the display device 102.

In one example, the screen of the control device 108 is a touch screen display, and a user may touch the border 118 and/or portion enclosed thereby and drag (as indicated by the arrow 126) the border to a new portion of the video as indicated by the dotted line box 128, releasing the user touch once the border has been dragged to the desired part of the video shown on the control device. In the new portion 128, two defensive players "X" are shown, denoted by subscripts "2" to distinguish them. As indicated by the arrow 130, this drag and drop causes the controller to pan the zoomed video from the first portion to the second portion in the direction of the drag until the second portion of the (higher definition) video substantially fills the screen of the display device 102 as shown at 132 in the figure.

Thus, responsive to the drag and drop of the border 118 on the control device 108, the content related to the video image on the display device 102 is entirely established, in temporal sequence, by a zoomed presentation of the first portion, then a moving pan across at least part of the video image on the display device in concert with the user input to move the border to the second portion of the video image on the control device, to end at a zoomed presentation on the display device of the second portion. During the drag and drop process, the control device presents both the entire video image of the content and the border 118 superimposed on the portion 120 of the video image as the user input causes the border to move across the video image of the content, whereas the display device 102 is caused to present only content from the video image corresponding to content 120 within the border 118 on the control device.

HTML5 may be used along with JavaScript (including some JavaScript libraries), and CSS in one implementation. Video files may be stored locally on the control device and played in the browser using the video tag of HTML5. Live streaming files from a local streaming server, streaming files from internet and live tuner signal can also be used as the source. To select a different file, a user drags and drops a tile; based on the id of the tile, the path of the video in the quad portion (on which the tile id dropped) of the display presenting video in four quadrants selected is changed to the correct video and this new video is played. A full screen API may not be used since it requires user interaction to allow full screen on the control device. Accordingly, as a workaround for full screen, all videos can be paused, then the video selected can be scaled by the browser to 4K resolution. If a 4K file is present, the 4K file is used, then no browser scaling is needed. Websocket may be used to communicate through IP from the control device to the controller to control the display device. Messages may be broadcast to all the display devices, then each display device browser can use the message it needs. Drag and drop can be done using the jQuery UI library, and scrolling can be done using CSS position updating. The stitch image zoom effect can be done by drawing video on the HTML5 canvas, sending coordinates from control device to the controller so the controller knows which portion of the video to zoom on in the display device.

A phone application may also be implemented in HTML5, allowing audio files from the server to be played on a speaker, e.g., of the display device or other device, through IP. The phone application audio matches the audio for the four videos played in the quad view, and each audio file can be selected for playback. When selecting an external device connected to a different HDMI input of the display device (such as video disk player, a satellite feed, etc.), when a user drags the appropriate tile for the external device, the control device may send IP commands to the display device (via the controller) to change input. If a tile corresponding to a video is drag and dropped, another IP command can be sent to the display device (via the controller) to change input back to PC and/or controller and the video file selected is played from the PC and/or controller.

FIGS. 4-7 illustrate additional principles that may be used according to present principles. On the left side of FIG. 4, one of the display devices 102 from FIG. 2 and one of the control devices 108 are shown schematically, and on the right side of FIG. 4 the same devices are shown schematically after an operation. As shown on the left side of FIG. 4, a multi-view channel has been launched on the display device 102, resulting in four video windows 400 ("quad view") being presented on the display device 102. Each window 400 presents a video stream from a respective audio video (AV) program P1-P4 from an Internet or broadcast source (cable, satellite, etc.) The audio from only one of the AV programs is played by the display device. The windows 400 may be substantially identical in size if desired, as shown.

A UI 402 is presented on the display of the control device 108. As shown, the UI 402 includes plural main selectors 404 arranged in a layout, preferably the same layout as the windows 400 on the display device 102 as shown. Each main selector 404 is established by a respective video feed, in the example shown, the same content albeit perhaps in lower resolution as the four videos in the quad view of the display device 102, as duly indicated by use of the same video program designators P1-P4.

The UI 402 may further include a row 406 of additional content selectors 408 apart from the programs P1-P4 shown in the main selectors 404, although in the embodiment shown, for ease of disclosure, the same four programs P1-P4 establish the first four content selectors 408 in the row 406, while the last two content selectors indicate they may be selected to present content from two additional programs P5 and P6. In some embodiments, unlike the main selectors 404, which recall are established by moving video, the content selectors 408 in the row 406 may be established by still image thumbnails.

Furthermore, a column 410 of audio selectors 412 may be presented on the UI 402. Each volume selector 412 in the column 410 may correspond to a respective content in the content selectors 408 in the row 406. Each audio selector 412 may include a respective audio on/off symbol 414, with all of the symbols 414 except one having a line through them indicating that the audio represented by those selectors is not being played on the display device 102. In contrast, in the example shown the symbol 414 of the top audio selector 412 does not have a line through it, indicating that the audio from the program associated with the top selector, in the example shown, program P1, is being played on the display device 102. Touching an audio selector 412 on the control device 108 causes the control device to command the controller to switch audio play on the display device 102 to the audio represented by the touched audio selector on the control device 108. This also causes the line through the respective symbol 414 of the touched selector to be removed, and a line placed onto the symbol 414 of the selector 412 representing the replaced audio.

Figure 4:
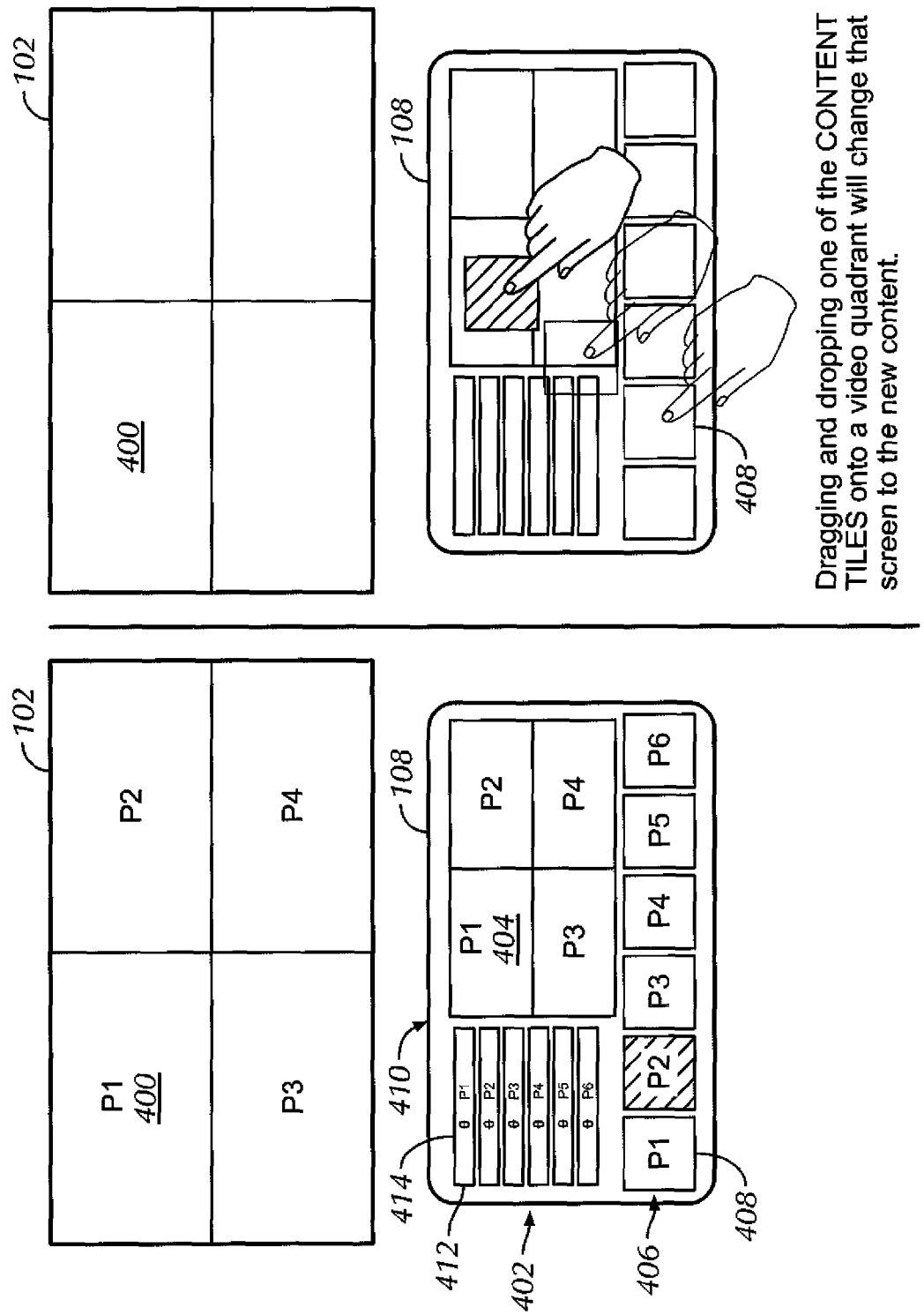
FIGS. 4-8 are each a series of screen shots illustrating various aspects of example embodiments.

The right side of FIG. 4 illustrates the dragging and dropping one of the content selectors 408 onto a main selector 404 changes the video in that main selector 404 to the video represented by the dragged and dropped content selector 408.

Not only does the UI 402 on the control device 108 thus change, but also, as indicated in the top right portion of FIG. 4, the video presented in the window 400 (in this, the top left window) of the display device 102 is also caused to change to the video represented by the dragged and dropped content selector 408. This may be done by the control device 108, responsive to the drag and drop, obtaining the network address or channel number of the video represented by the dragged and dropped content selector 408 and commanding the controller to present video from that network address in the window 400 corresponding to the main selector 404 onto which the content selector 408 was dragged and dropped. In any case, it will readily be appreciated that the main selectors 404 on the control device 108 mirror the windows 400 on the display device 102. A user may move his hand left or right on the row 406 of content selectors to cause selectors for additional content to scroll onto the display of the control device. The new content typically includes additional program channels or Internet content related to the theme of the programming presented on the display device 102, including, for example, sports statistics related to a sporting event in one of the windows 400.

Figure 5:
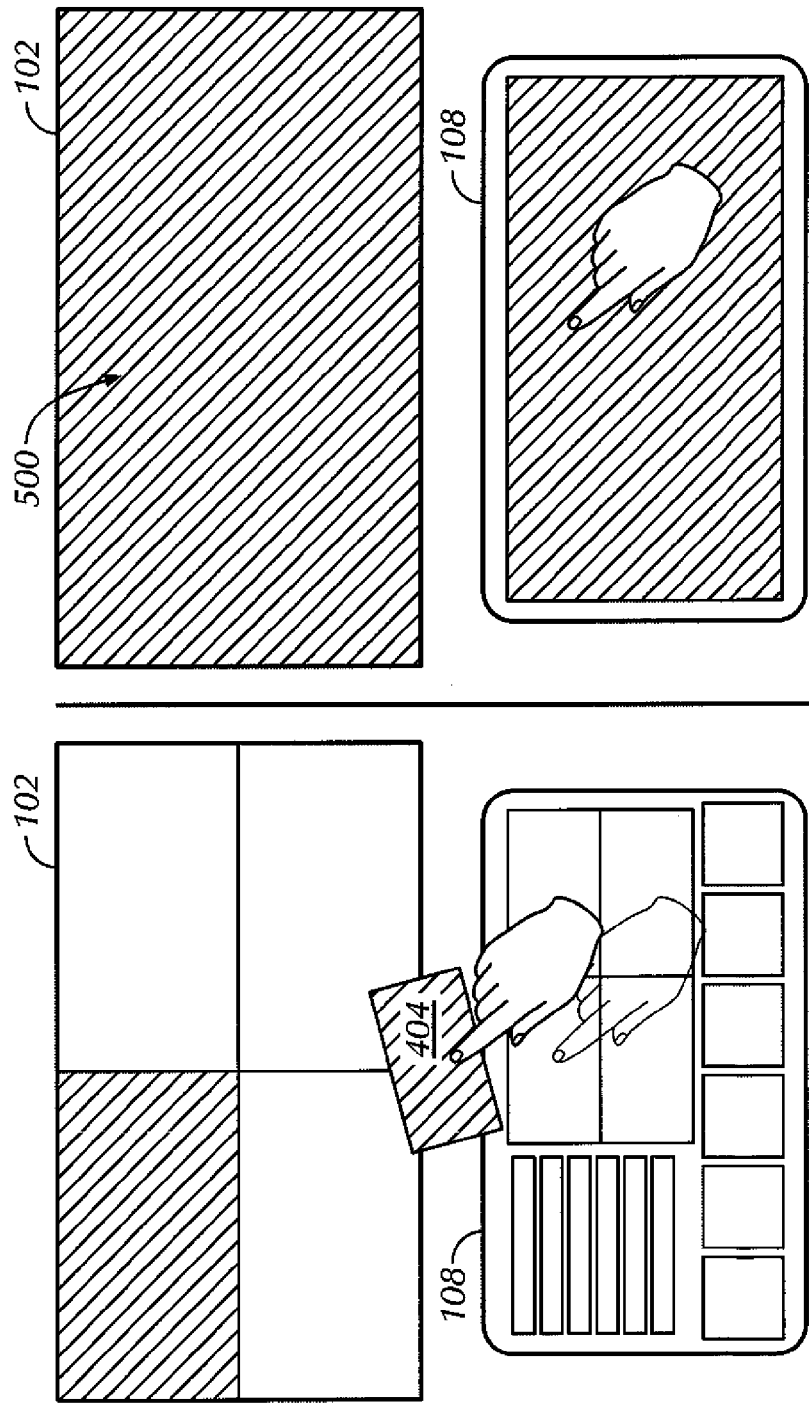

The left side of FIG. 5 illustrates that "throwing" one of the main selectors 404 on the control device 108 "to" the display device 102 causes the display device to switch to a full screen presentation 500 (shown on the right of FIG. 5) of the content represented by the "thrown" main selector 404. The processor of the control device 108 may infer that a main selector 404 has been "thrown" by a user dragging the main selector upwards toward the top of the control device, responsive to which the control device 108 sends a command to the controller to present the associated content full screen on the display device 102.

Although not shown in FIG. 5, commanding the display device 102 into the full screen mode as described above may result in the main selectors 404 on the control device 108 merging into a single large selector with the same content shown full screen on the display device. However, the row 406 of content selectors 406 and column 410 of audio selectors 412 can remain unchanged. This single large main selector in the area formerly occupied by the four main selectors may be touched to cause the display device (pursuant to a command from the control device) to revert to the quad view shown on the left side of FIG. 5 and to also cause the main selectors 404 on the control device 108 to mirror the display device views, in this case, to resume the four main selector quad view shown on the bottom left of FIG. 4.

Alternatively, throwing a main selector 404 to cause the display device to enter full screen mode as described may not alter the appearance of the main selectors 404, which can remain in the quad view shown on the control device. Subsequently touching any one of the main selectors 404 on the control device may result in the control device commanding the controller to resume the quad view presentation on the display device. Or, if desired, as shown on the bottom right of FIG. 5, when the control device has been configured to command the display device to enter full screen mode, with the four main selectors 404 remaining on the control device UI, touching one of the main selectors may cause the corresponding content to be presented full screen on the control device. The content presented full screen on the display device may be the same or different than the content presented full screen on the control device, depending on what main selector 404 was thrown to the display device and what main selector 404 subsequently was touched by a user. A subsequent touch anywhere on the control device screen may cause the control device and display device to resume the layouts shown on the left side of FIG. 5.

Figure 6:
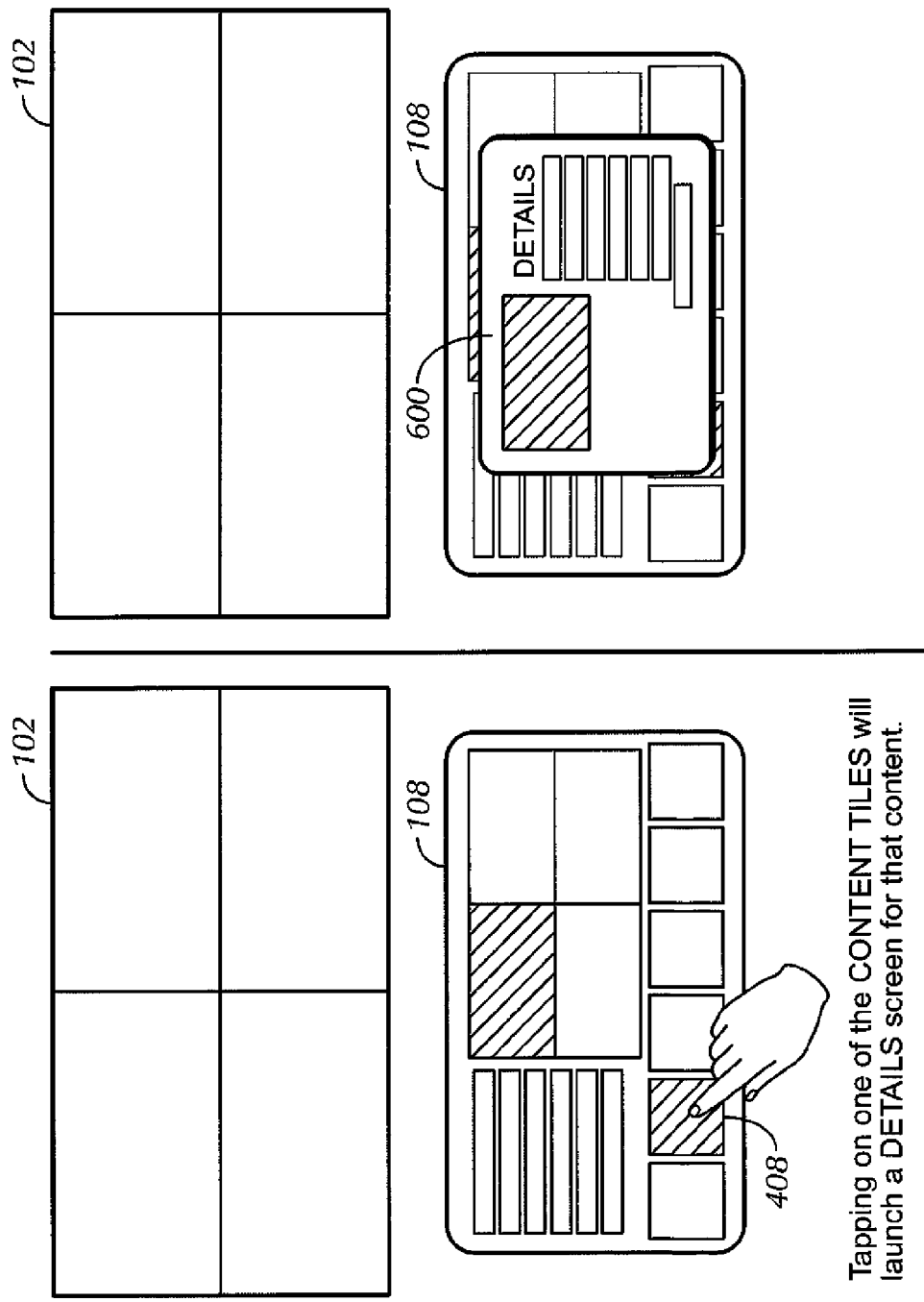

To view the details of any content represented by a content selector 408, as shown in the left side of FIG. 6 a user may simply touch the content selector 408. This may cause a detail screen 600 to appear on the control device 108 (but not on the display device 102), so that a person controlling presentation on the display device by means of the control device 108 can observe the detailed information about content prior to presenting the content (or information about the content) on the display device 102.

Figure 7:
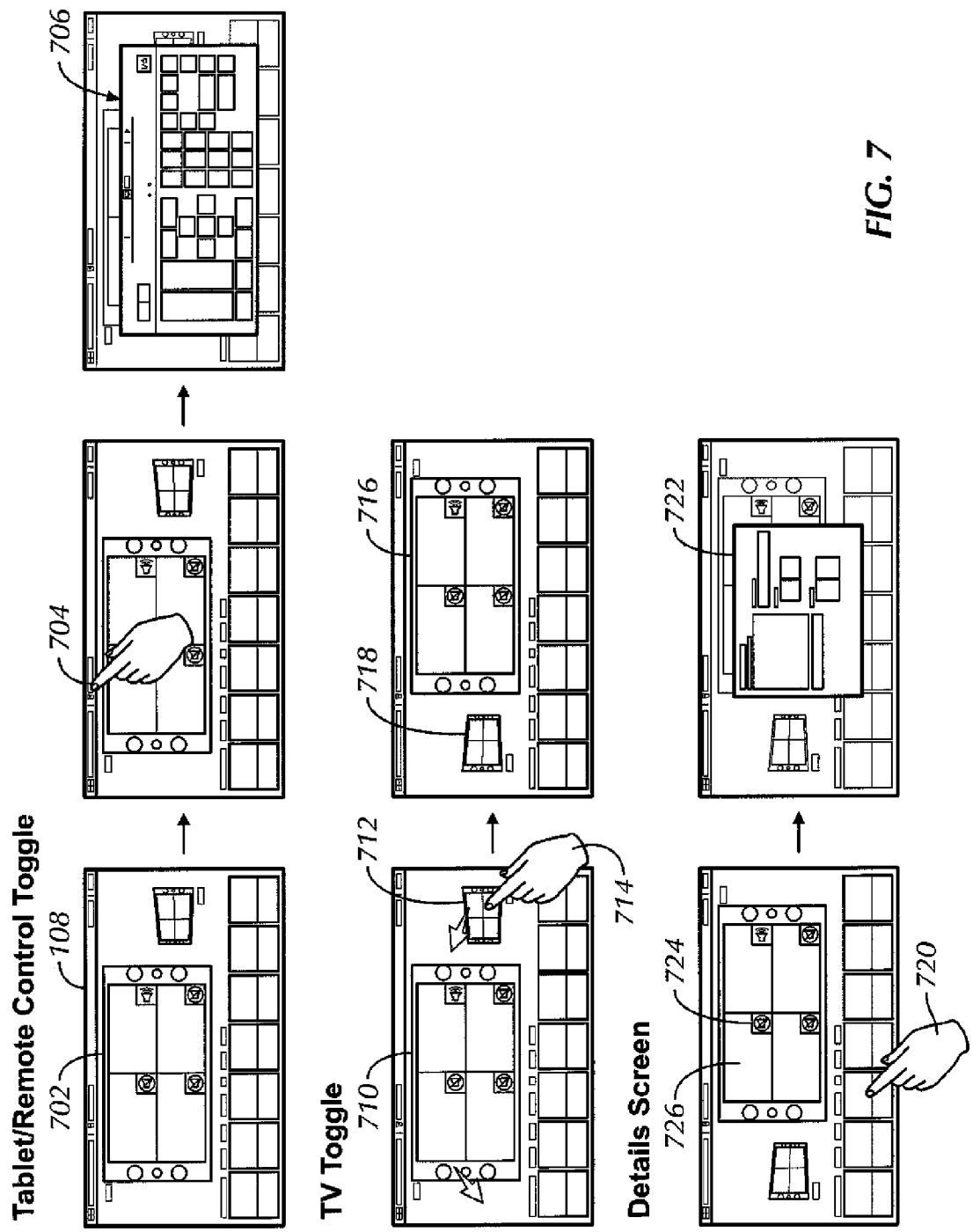

FIG. 7 is a series of screen shots on the control device 108 to illustrate further optional details. A remote control selector 702 may be presented which if touched as indicated at 704 can cause a remote-control like presentation 706 to be presented on the control device 108. The presentation 706 emulates a standard remote control, with alpha-numeric touch-enabled input selectors, channel and volume up/down selectors, and cursor arrow selectors as shown. Touching the selector 702 again causes the initial presentation (upper right panel in FIG. 7) to resume on the control device.

When a single control device 108 is used to control both display device 102 shown in FIG. 2, as shown at 708 in FIG. 7 main selectors 710 corresponding to the quad view of a first one of the display devices 102 may be presented and used to control that display device according to principles above. Also, a smaller quad view of alternate main selectors 712 may be presented, representing content being presented on the second display device 102. To enable control of the second display device 102 using the control device 108, a user need only touch the smaller quad view of alternate main selectors 712 as shown at 714, causing the smaller quad view of alternate main selectors 712 to animate to an enlarged configuration 716 and the quad view of main selectors corresponding to the first one of the display devices 102 to animate to become smaller in size as shown at 718. The enlarged configuration of main selectors on the control device 108 appertaining to the second display device 102 may then be used to control the presentation on the second display device according to principles above.

The bottom two screen shots in FIG. 7 show that tapping 720 on a content selector can cause a detail presentation 722 to be shown on the control device, showing the details of the content represented by the tapped content selector. Also, as shown at 724, instead of a column of audio selectors as described previously, respective audio on/off symbols analogous to the symbols 414 in FIG. 4 may be presented on each main selector 726 and if touched cause the control device to command the controller to replace the associated audio with the touched symbol to replace the audio currently being played on the display device being controlled.

While a four screen quad view is discussed and shown, any number of windows in a multi-window arrangements may be used.

Figure 8:
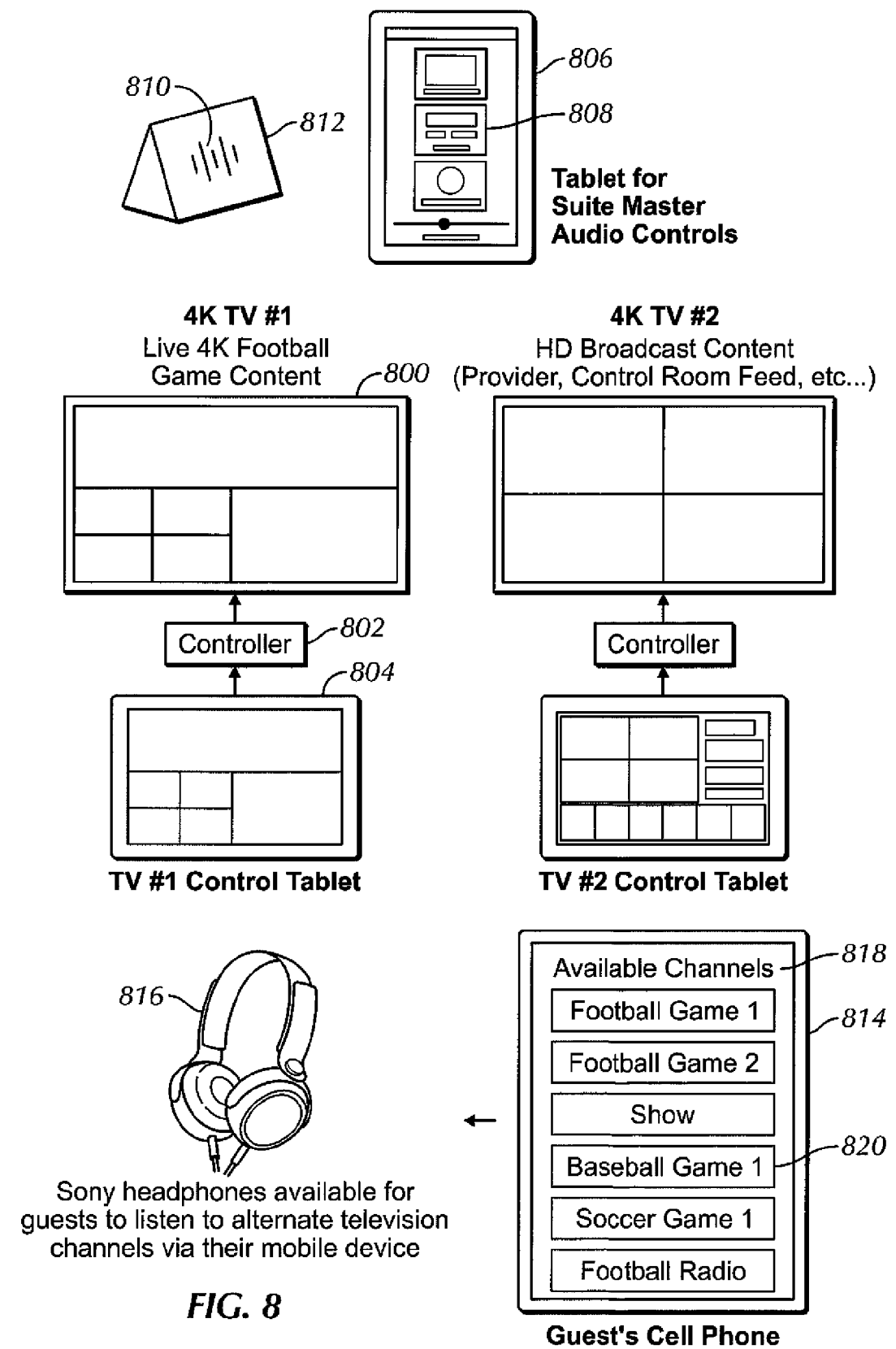

FIG. 8 shows a dual display device system similar to the system shown in FIG. 2 and described above, with the following additional features. Two display devices 800 may be controlled by respective controllers 802 responsive to commands input from respective control devices 804. Additionally, an audio control device 806 may be provided that may be substantially identical in construction to the control devices 804 for controlling which audio is played on the speakers of the display devices 800. Thus, each of the control devices 804, 806 may have some or all of the components of one of the CE devices shown in FIG. 1.

Only a single audio preferably is selected for play because, recall, the display devices as shown have multiple video windows, but it is desired to play only audio associated with video in a single one of the windows to avoid distracting overlapping audio. When the displays are side by side or otherwise positioned near each other, both display devices may play the same audio regardless of whether the accompanying video is shown on only one or both of the display devices.

As shown, the audio control device 806 may present a list, e.g., in a column, of thumbnail-like audio selectors 808, each being selectable to cause the audio control device 806 to command, e.g., wirelessly, the controllers 820, 804 to play on the display devices 800 the audio represented by the selected audio selector 808.

In one non-limiting example, a user of the audio control device 806 may use the camera of the device 806 to image a bar code 810 on a substrate 812 located in the same room as the other devices shown in FIG. 8. The bar code may include, e.g., a network address of a web site that the processor of the audio control device 806 reads and in response invokes a browser to navigate to the web site. Of course, other means for the audio control device 806 to obtain the address of the web site hosting the audio selector UI may be used. The web site may download an application such as an application programming interface (API) to the audio control device 806, or may otherwise provide the UI with the audio selectors 808 as shown to the audio control device 806. It is to be appreciated that the web site associated with the network address from which the UT with the audio selectors 808 is obtained is typically associated with the network sources of the various video streams presented in the windows of the display devices 800, so that for each video stream presented in a window of a display device 800, the audio web site provides a respective audio selector in the list presented on the audio control device 806 that may be selected to cause audio associated with the video stream to be played on speakers of the display device(s) 800 according to discussion above.

It will now be appreciated that while multiple video streams can be presented on the display device(s) 800, to avoid distracting overlapping audio, the display device(s) play only a single audio stream associated with one of the videos. As recognized herein, however, when multiple people are in the room, one or more of them may wish to unobtrusively listen to an audio stream that is associated with one the video streams being presented on the display device(s) 800 but that is not the audio stream selected for play by the display device(s) 800. Accordingly, a tertiary or monitoring device 814 that can receive audio and play it on headphones 816 that are connected to the monitoring device 814 wired or wirelessly may be employed as described below. In an example, the monitoring device 814 may be the wireless smart phone of the user and thus may incorporate some or all of the components shown in the CE devices of FIG. 1. Note that "headphones" includes any private listening apparatus including, for example, ear buds.

As shown in FIG. 8, the monitoring device 814 can present a list 818 of plural audio feeds, with each audio feed corresponding to a respective video content being simultaneously provided to a display device 800 that is separate from the monitoring device 814. The list 818 includes plural audio selectors 820, and selecting an audio selector 820 causes the monitoring device 814 to play an audio feed associated with the selected audio selector 820 on the monitoring device, and preferably to play the audio on the headphones 816 of the monitoring device. In this way, a user of the monitoring device 814 can view the display device(s) 800 and listen to audio on the monitoring device 814 that is associated with video content being presented in one of the windows of the display device 800 but that is not the audio being played on the display device(s) 800.

In one non-limiting example, a user of the monitoring device 814 may use the camera of the device 814 to image the bar code 810 which, recall, may include, e.g., a network address of a web site that the processor of the monitoring device 814 reads and in response invokes a browser to navigate to the web site. Of course, other means for the monitoring device 814 to obtain the address of the web site hosting the audio selector UI may be used. The web site may download an application such as an application programming interface (API) to the monitoring device 814, or may otherwise provide the UI with the audio selectors 820 as shown to the monitoring device 814. It is to be appreciated that the web site associated with the network address from which the UI with the audio selectors 820 is obtained is typically associated with the network sources of the various video streams presented in the windows of the display devices 800, so that for each video stream presented in a window of a display device 800, the audio web site provides a respective audio selector in the list presented on the monitoring device 814 that may be selected to cause audio associated with the video stream to be downloaded from the web site and played on the headphones 816.

Without limitation, the audio provided from the web site to the monitoring device may be extracted from the AV streams provided by the cameras with associated microphones. This extraction may be effected using an extraction tool such as "FFmpeg" and/or may extract the audio file from an AV object by recognizing and extracting audio file extensions such as but not limited to "mp3", "aac", etc.

While the particular CONTROL OF LARGE SCREEN DISPLAY USING WIRELESS PORTABLE COMPUTER AND FACILITATING SELECTION OF AUDIO ON A HEADPHONE is herein shown and described in detail, it is to be understood that the subject matter which is encompassed by the present invention is limited only by the claims.

What is claimed is:

1. A device comprising:
   at least one computer memory that is not a transitory signal and that comprises instructions executable by at least one processor for:
   presenting on a monitoring device a list of plural audio feeds including at least first and second audio feeds, each audio feed corresponding to a respective video content being simultaneously provided to a display device separate from the monitoring device such that the first audio feed corresponds to a first video content provided to the display device and the second audio feed corresponds to a second video content provided on the display device and being presented on the display device along with the first video content, wherein the display device is configured to simultaneously present at least first and second video contents on a display thereof but play only first audio associated with only the first video content, the list of plural audio feeds including plural audio selectors each selectable to cause the monitoring device to play a respective audio feed;
   receiving selection of an audio feed from the list; and
   responsive to the selection, playing the audio feed on the monitoring device, wherein the list of audio feeds is presented on a user interface (UI) presenting an ordered list of audio selectors, each audio selector corresponding to a respective video content represented by respective video content selectors presented on the UI, each audio selector including a respective audio on/off symbol, with all of the symbols except one having a line through them indicating that audio re resented by those selectors is not being played, a symbol associated with a selected audio selector not having a line through it, indicating that audio from a program associated with the selected audio selector is being played, wherein selecting an audio selector commands a controller to switch audio play to audio represented by a selected audio selector, which also causes a line through the respective symbol of the selected audio selector to be removed, and a line placed onto a symbol of deselected audio selector.

2. The device of claim 1 wherein the selection is such that a user of the monitoring device can view the display device and listen to the second audio on the monitoring device while viewing the second video content on the display device with the display device playing the first audio.

3. The device of claim 1, wherein the playing of the audio feed is executed by playing the audio feed on headphones.

4. The device of claim 1, wherein the monitoring device is established by a wireless telephone.

5. The device of claim 1, wherein the instructions are executable for receiving the software application by imaging a bar code disposed on or near the display device and correlating the bar code to a network address at which the software application is available.

6. The device of claim 1, wherein the instructions are executable for playing the audio feed on the monitoring device responsive to downloading the audio feed from a computer network.

7. System comprising:
display device configured for presenting plural video contents in respective windows of the device and for playing first audio associated with a first one of the video contents;
controller configured for controlling the display device;
control device configured for communicating commands to the controller to control presentation on the .display device; and
monitoring device configured for playing second audio as associated with a second one of the video contents on the display device while the display device plays the first audio and presents the first and second video contents simultaneously, the monitoring device presenting first and second audio selectors respectively selectable to play, on the monitoring device, the first and second audio, wherein audio selectors are presented on a user interface (UI) as an ordered list audio selector, each audio selector corresponding to a respective video content, each audio selector including a respective audio on/off symbol, with all of the symbols except one having is line through them indicating that audio represented by those selectors is not being played, it symbol associated with a selected audio selector not having a line through it, indicating that audio from a program associated with the selected audio selector is being played, wherein selecting an audio selector commands a controller to switch audio play to audio represented by a selected audio selector, which also causes a line through the respective symbol of the selected audio selector to be removed and a line, placed onto a symbol of a deselected audio selector.

8. The system of claim 7, wherein the display device is established by an ultra high definition(UHD) display.

9. The system of claim 7, wherein the monitoring device is established by a wireless telephone.

10. The system of claim 7, wherein the controller is established by a game console.

11. The system of claim 7, wherein the controller is established by a personal computer (PC).

12. The system of claim 7, wherein the control device is established by a laptop computer or tablet computer.

13. Method comprising:
providing plural video contents to a display device for simultaneous presentation thereof on the display device;
providing plural audio streams to the display device for presentation of a user-selected one of the audio streams from a list of audio streams on the display device, the audio streams corresponding to respective ones of the video contents; and
providing a list of audio selectors to a monitoring device for selection of one of the audio streams for play on the monitoring device, such that a user of the monitoring device can view the display device and listen to a first audio stream on the monitoring device while viewing a respective first video content on the display device with the display device playing a second audio stream associated with a second video content, wherein audio selectors are presented on a user interface (UI) as an ordered list of audio selectors, each audio selector corresponding to a respective video content, each audio selector including a respective audio on/off symbol, with all of the symbols except one having a line through them indicating that audio represented by those selectors is not being played, a symbol associated with a selected audio selector not having a line through it, indicating that audio from a program associated with the selected audio selector is being played, wherein selecting an audio selector commands a controller to switch audio play to audio represented by a selected audio selector, which also causes a line through the respective symbol of the selected audio selector to be removed, and a line placed onto a symbol of a deselected audio selector.

14. The method of claim 13, comprising playing the second audio stream on headphones associated with the monitoring device.

15. The method of claim 13, wherein the monitoring device is established by a wireless telephone.

16. The method of claim 13, comprising receiving the list by imaging a bar code disposed on or near the display device and correlating the bar code to a network address and downloading the list from the network address.

17. The method of claim 13, comprising playing the first audio feed on the monitoring device responsive to downloading the first audio feed from a computer network.

* * * * *